(No Model.) 3 Sheets—Sheet 1.
W. M. FOWLER.
LIQUID MEASURING AND DISPENSING APPARATUS.

No. 491,705. Patented Feb. 14, 1893.

Witnesses:—
D. H. Hayford
Fred Haynes

Inventor:—
William M. Fowler
by attorneys
Brown & Seward

THE NORRIS PETERS CO., PHOTO-LITHO., WASHINGTON, D. C.

(No Model.) 3 Sheets—Sheet 2.

W. M. FOWLER.
LIQUID MEASURING AND DISPENSING APPARATUS.

No. 491,705. Patented Feb. 14, 1893.

Witnesses:—
D. H. Hayford
Fred Haynes

Inventor:—
William M. Fowler
by attorneys
Brown & Seward (No Model.) 3 Sheets—Sheet 3.

W. M. FOWLER.
LIQUID MEASURING AND DISPENSING APPARATUS.

No. 491,705. Patented Feb. 14, 1893.

Witnesses:
D. H. Haywood
Fred Haynes

Inventor:
William M. Fowler
by attorneys
Brown & Seward

UNITED STATES PATENT OFFICE.

WILLIAM M. FOWLER, OF MILFORD, CONNECTICUT.

LIQUID MEASURING AND DISPENSING APPARATUS.

SPECIFICATION forming part of Letters Patent No. 491,705, dated February 14, 1893.

Application filed March 1, 1892. Serial No. 423,438. (No model.)

*To all whom it may concern:*

Be it known that I, WILLIAM M. FOWLER, of Milford, in the county of New Haven and State of Connecticut, have invented a new and useful Improvement in Liquid-Dispensing Apparatuses, of which the following is a specification.

My invention relates to an improvement in liquid dispensing apparatuses in which different predetermined quantities may be drawn from a receptacle and a register-operating device moved through different distances during the act of drawing to correspond with and effect the registering of the different prices of the quantities of liquid drawn.

Figure 2:
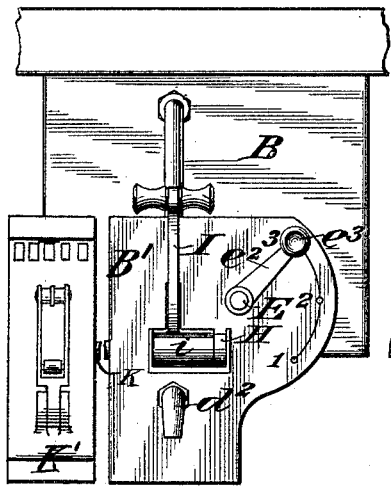
Figure 1:
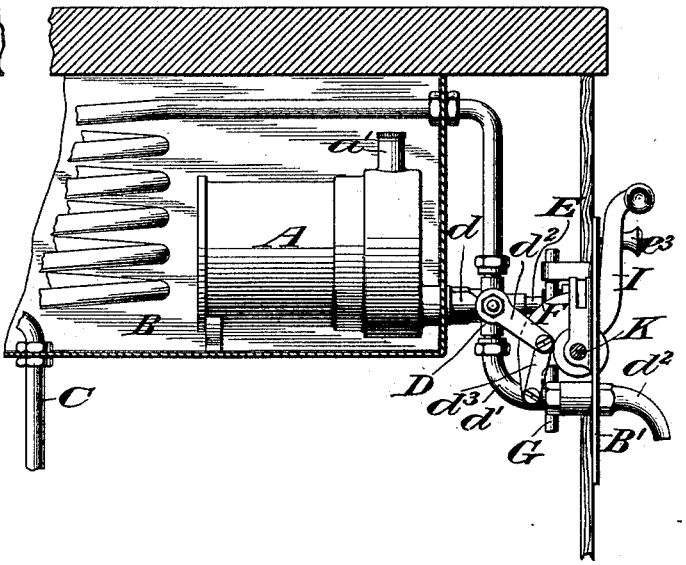
Figure 3:
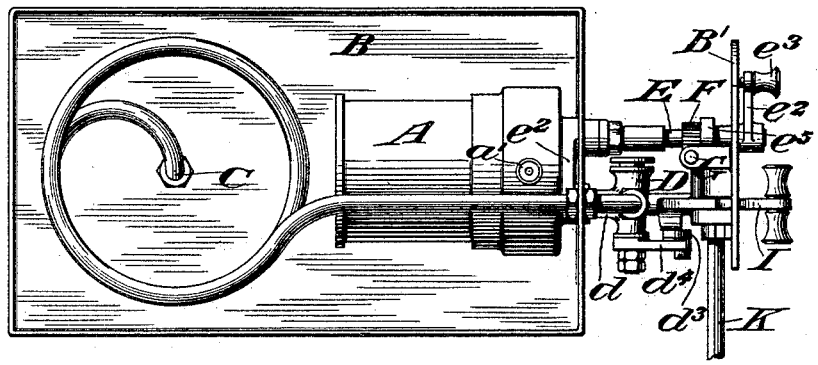
Figure 5:
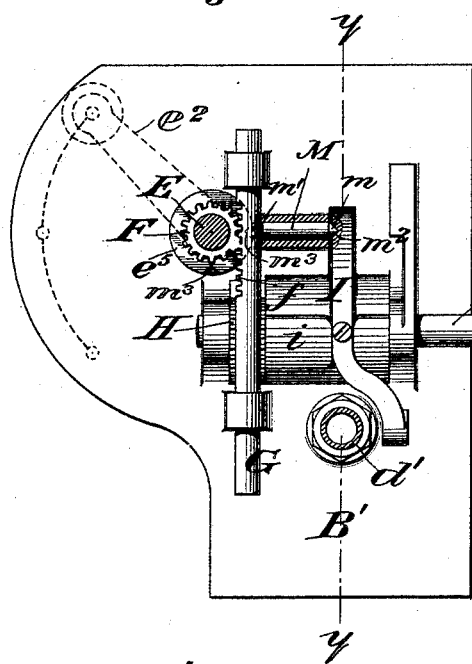
Figure 4:
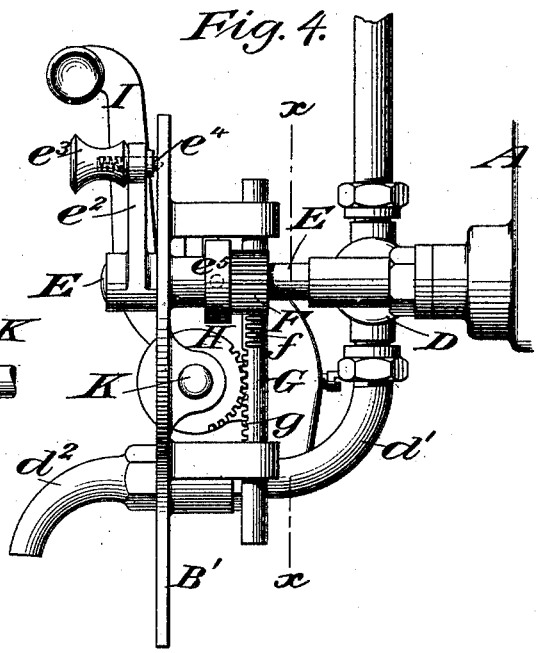
Figure 6:
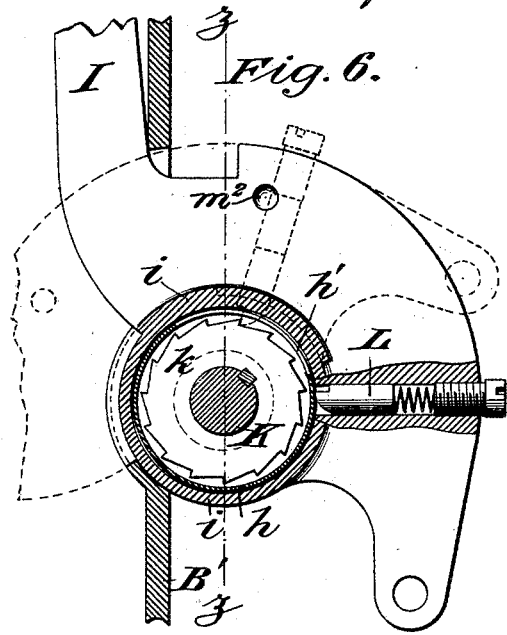
Figure 7:
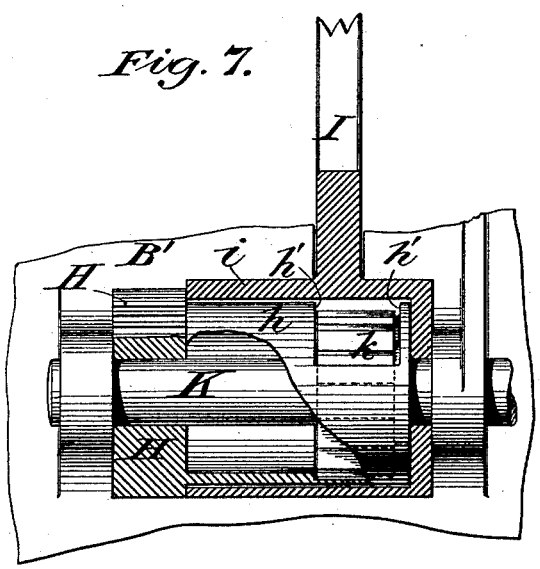
Figure 8:
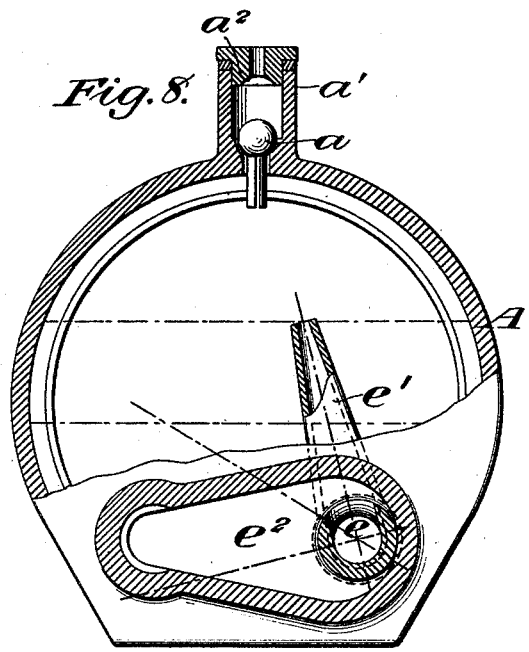
Figure 9:
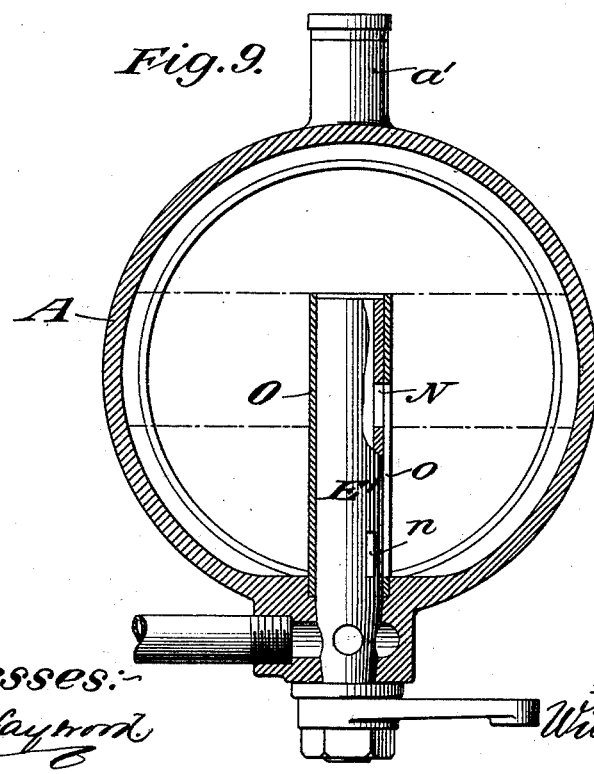

A practical embodiment of my invention is represented in the accompanying drawings in which Figure 1 is a view of the apparatus in side elevation, Fig. 2 is a front view, Fig. 3 is a top plan view, Fig. 4 is an enlarged view of the parts exclusive of the receptacle from which the liquid is drawn, taken from the opposite side from Fig. 1, Fig. 5 is a section through line $x$, $x$ of Fig. 4, looking toward the front, Fig. 6 is a view through line $y$, $y$ of Fig. 5, Fig. 7 is a view through line $z$, $z$, of Fig. 6, Fig. 8 is a transverse vertical section partly in elevation, and on an enlarged scale, of the receptacle from which the liquid is drawn and Fig. 9 is a similar view of a modified form of receptacle and outletting device.

A represents a receptacle from which the different quantities of liquid are to be drawn. An air inlet and outlet valve $a$ is seated in a chamber $a'$ in communication with the top of the receptacle. When the valve is down, as in Fig. 8, air may pass freely by it but when floated to its seat $a^2$ by the rising of the liquid it will cut off the escape of the liquid by overflow.

I have shown the receptacle A inclosed within a casing B the interior of which may form a cooling chamber, and have shown a supply pipe C leading from a source of supply, not shown, through the interior of the casing B and thence to a three way cock D, located at the juncture of pipes $d$ and $d'$, the former leading to the receptacle A and the latter to a spout $d^2$. Liquid is admitted to the pipe $d$ from within the receptacle A by an outletting device controlled by the operator as follows:

A rock shaft E, tubular at its inner end, as shown at $e$ Fig. 8, extends through the end of the receptacle A the tubular portion extending from without to a point within the receptacle and at its inner end provided with a laterally extending tubular arm $e'$ open at its end and in communication with the hollow portion $e$ of the shaft. The shaft enters the receptacle at or near its bottom and preferably off to one side of the bottom and, as the shaft is rocked, it will raise or lower the open end of the arm $e'$ so as to draw from within the receptacle A a less or greater amount of the liquid therein. The hollow portion $e$ of the rocking shaft is at all times in communication with the pipe $d$ leading to the receptacle, the communication being preferably established by means of a chamber $e^2$ at the front of the receptacle with which chamber the hollow portion $e$ of the rock shaft and the pipe $d$ both communicate.

The shaft E has fixed on its front end a crank $e^2$ by means of which it is rocked to raise and lower the mouth of the arm $e'$ within the receptacle and the handle $e^3$ of the crank is so connected with the crank proper as to yield in the direction of its length and thereby release a point $e^4$ on its inner end from shallow seats numbered 1, 2 and 3 respectively and formed in the outer face of the support B' in front of the casing B. The indentations 3, 2 and 1 are so located as to hold the outletting arm $e'$ in positions to draw from the receptacle A three pints, two pints and one pint respectively. It is of course understood that the number of different quantities and the particular dimensions of the measures may be varied at pleasure to suit the different purposes to which the apparatus may be devoted.

In setting the outletting devices to permit the outflow of the different quantities of liquid, I provide for the different rotary movements of the registry operating shaft under the impulse of the lever which operates the three way cock to dispense the liquid as follows: On the shaft E there is fixed a pinion F which intermeshes with a vertically sliding rack bar G. The rack bar G has a set of rack teeth $f$ thereon for intermeshing with the pinion F and another set of rack teeth $g$ for intermeshing with a spur wheel or sector H mounted in the present instance on the same axis as the cock operating lever I. The spur-wheel or sector H is fixed to rotate with a sleeve $h$ which extends within a hollow hub $i$ on the lever I and both the wheel and sector H and the lever I are mounted loosely upon a registry operating shaft K; the shaft K has fixed to rotate therewith a ratchet wheel $k$ and connection between the said shaft and the lever I is effected by means of a spring actuated dog L seated in a suitable socket formed in the hub of the lever I. The sleeve $h$ fixed to rotate with the spur wheel or sector H is adapted to extend across the path of the dog L and holds it out of engagement with the teeth on the ratchet $k$. The sleeve $h$ is however cut away a pre-determined distance, as shown at $h'$, Fig. 7, so that when its cut away portion comes opposite the dog L the latter will be allowed to extend through the opening into engagement with the ratchet teeth. The movement of the sleeve $h$ is so timed with respect to the movements of the crank $e^2$ that when the crank is in position with its handle seated in the socket 3, the downward stroke of the operating lever I will rotate the shaft K a distance of three teeth of the ratchet $k$. When the crank $e^2$ is turned to bring the handle into engagement with the indentation 2, the sleeve $h$ will have been thereby rotated so as to interpose itself between the dog L and a portion of the ratchet teeth on the wheel $k$ and a full stroke of the operating lever I will effect a movement of the shaft K only a distance of two teeth. In the same manner the swinging of the crank $e^2$ down into position so that its handle will engage the indentation 1 will interpose the sleeve $h$ between the dog L and the ratchet teeth so that it will have an opportunity of moving the shaft K one tooth only during a complete down stroke of the lever I. Thus it will be seen that the movements of the shaft K depend upon the quantities which the outletting devices are set to draw.

A registering device of any well known or approved construction is represented conventionally by K', Fig. 2, and is supposed to be operated by the shaft K.

The operating lever I is connected with a crank arm $d^4$ on the three way cock D by a link $d^3$ and the communication between the outletting port in the cock and the pipe $d$ is such that the opening for the dispensing of the liquid is effected just as the lever I reaches the downward limit of its stroke and after it has rotated the shaft K to a point within less than one-half a ratchet tooth's distance of its complete stroke. The purpose of this is to complete the registry of the amount to which the crank $e^2$ is set before a drop of it can be drawn.

In order to prevent the operation of the lever I when the crank $e^2$ is set at any point intermediate of the pre-determined point and in order to prevent the manipulation of the crank $e^2$ after the operating lever I has once been started on its stroke I provide the following interlocking mechanism. A sliding pin or bar M is seated in a socket in the support in front of the casing B and is provided with beveled ends $m$ and $m'$ for engaging respective seats formed in the operating lever I in a disk $e^5$ carried by the shaft E. The lever I is provided with a single seat $m^2$ and the disk $e^5$ with a number of seats $m^3$, one for each of the predetermined ports 3, 2 and 1 at which the crank is to be set to draw predetermined quantities from the receptacle. The pin or bar M is of such length that when it is seated either in a seat in the lever or in the disk the other of the ports in which it is not seated will be allowed to operate but not otherwise. The seat in the lever is so located as to correspond with a seat in the disk when the operating lever is at the uppermost limit of its stroke. If, therefore, it be desired to operate the crank $e^2$ to set the outletting devices, the operating lever I must be at the uppermost limit of its stroke so that the pin or bar M may enter the seat therein and permit the shaft E to rock. On the other hand, if it be desired to operate the lever I the same one of the seats in the disk $e^5$ must be directly opposite the seat in the lever in order that the pin or bar may be set free from the lever and permit it to rock.

In Fig. 9 I have shown an outletting device in which the hollow portion of the rocking shaft extends up through the bottom of the receptacle and into its interior to such a height as desired for drawing the least quantity at one time from the receptacle. Such modified form of outletting devices I have shown by E' and provided it with ports N and $n$ located at different heights through its side and out of alignment and have surrounded the interior portion of such shaft with a casing O forming a liquid tight joint therewith, excepting along the narrow slit $o$ extending from the bottom of the casing up to the top of the port N.

In operation, when the shaft E is rotated so as to bring both of its ports out of alignment with the slit $o$ in the casing O, it will draw from the receptacle only down to a level with the top of the shaft. When it is rotated so as to bring the port N to register with the slit $o$, it will draw from the receptacle down to a point on a level with the bottom of the port N and when it is turned to bring the port $n$ to register with the slit $o$, it will draw from the receptacle down to the bottom of the port $n$.

The three way cock D to which reference has heretofore been made, may be of any well known or approved form, the ports within being so arranged that when the operating lever I is at the uppermost limit of its stroke there will be free communication between the supply pipe and the interior of the receptacle through the pipe $d$, and when the operating lever $I$ is at the lowermost limit of its stroke, communication between the supply pipe and the interior of the receptacle will be shut off and open communication established between the pipe $d$ and the spout $d^2$.

It is obvious that slight changes might be resorted to in the form and arrangement of the several parts described without departing from the spirit and scope of my invention, hence I do not wish to limit myself strictly to the structure and arrangement herein set forth, but

What I claim is:

1. Dispensing apparatus comprising a liquid receptacle, an outletting device, through which the liquid is adapted to pass directly downwardly and outwardly from the receptacle, said outletting device having a movement within the receptacle to raise and lower the point at which the liquid is permitted to enter the end of the outletting device to flow from the receptacle and means for operating the outletting device substantially as set forth.

2. Dispensing apparatus comprising a liquid receptacle, an outletting device having a movement within the receptacle to adjust the quantity of liquid to be dispensed, means for operating the outletting device, a device for permitting and arresting the flow of liquid from the receptacle, a registry operating shaft and mechanism intermediate the registry operating shaft and the device for regulating the flow and the means for operating the outletting device, whereby the operating of the outletting device regulates the movement of the registry operating shaft under the control of the device for regulating the flow, substantially as set forth.

3. Dispensing apparatus, comprising a measuring receptacle, a general supply conduit leading thereto, an outletting device, means for operating the outletting device, a rotary registry shaft, an operating lever for permitting and arresting the flow into and out of the measuring receptacle, means for connecting the lever interruptedly with the shaft and a stop under the control of the outletting operating device to regulate the connection of the operating lever with the shaft, substantially as set forth.

4. Dispensing apparatus, comprising a measuring receptacle, a general supply conduit leading thereto, an outletting device having a rocking movement within the receptacle, means for rocking the outletting device predetermined distances, means of permitting and arresting the flow of liquid to and from the measuring receptacle, an operating lever for said means, a registry operating shaft, a dog for interruptedly connecting the operating lever and the shaft, a sleeve for stopping the dog from engaging the shaft and a connection between the sleeve and the means for operating the outletting device, substantially as set forth.

5. Dispensing apparatus, comprising a measuring receptacle, an outletting device, means for operating the outletting device, an operating lever for permitting and arresting the flow of liquid to and from the receptacle and a locking pin or bar adapted to engage the outletting operating means and the operating lever and mutually interlock them against movement except under predetermined conditions, substantially as set forth.

WILLIAM M. FOWLER.

Witnesses:
FREDK. HAYNES,
D. H. HAYWOOD.